(12) United States Patent
Berenzweig et al.

(10) Patent No.: US 6,266,412 B1
(45) Date of Patent: Jul. 24, 2001

(54) ENCRYPTING SPEECH CODER

(75) Inventors: Adam L. Berenzweig, New York, NY (US); Steven Anthony Falco, Morris Plains, NJ (US); Semyon B. Mizikovsky, Morganville, NJ (US); Winston Edward Pekrul, Piscataway, NJ (US); Robert John Rance, Andover, MA (US); Donald Joseph Youtkus, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/097,782

(22) Filed: Jun. 15, 1998

(51) Int. Cl.[7] ........................................ H04K 1/06
(52) U.S. Cl. ...................... 380/37; 380/274; 380/275; 380/276; 380/43
(58) Field of Search .......................... 380/37, 43, 274, 380/275, 276

(56) References Cited

U.S. PATENT DOCUMENTS

| | | | |
|---|---|---|---|
| 5,363,448 | * 11/1994 | Koopman et al. | 713/170 |
| 5,381,480 | * 1/1995 | Butter et al. | 380/37 |
| 5,432,848 | * 7/1995 | Butter et al. | 380/2 |
| 5,606,616 | * 2/1997 | Sprunk et al. | 380/29 |
| 5,623,549 | * 4/1997 | Ritter | 380/37 |
| 5,671,283 | * 9/1997 | Michener et al. | 713/161 |
| 5,673,319 | * 9/1997 | Bellare et al. | 713/181 |
| 5,694,473 | * 12/1997 | Bright et al. | 380/42 |
| 5,745,577 | * 4/1998 | Leech | 380/28 |
| 5,757,913 | * 5/1998 | Bellare et al. | 713/168 |
| 5,825,886 | * 10/1998 | Adams et al. | 380/28 |
| 5,949,884 | * 9/1999 | Adams et al. | 380/29 |
| 5,987,124 | * 11/1999 | Matyas et al. | 380/37 |

OTHER PUBLICATIONS

Wagner, Schneier, Kelsey, Cryptanalysis of the Cellular Message Encryption Algorithm, Mar. 20, 1997, Counterpane Systems.*

How Security is Implemented, University of Deleware (http://www.mis2.udel.edu/~hector/telecomm/ciphers.html).*

Schneier, Bruce, Applied Cryptography Second Edition : protocols, algorithms and source code in C, John Wiley & Sons, Inc. pp. 419,420.*

* cited by examiner

Primary Examiner—Tod Swann
Assistant Examiner—Ronald F. Sulpizio
(74) Attorney, Agent, or Firm—Jimmy Goo

(57) ABSTRACT

Disclosed is an encrypting speech processor architecture that provides enhanced security without the use of external cryptosync and with minimal speech degradation. This is accomplished by incorporating a block encryptor and a keystream generator (instead of a fixed secret mask encryption scheme, such as those implemented in voice ciphers) for encrypting blocks of encoded speech bits at a transmitter side. The block encryptor employs an invertible cryptographic algorithm and internal cryptosync to convert a first block of encoded speech bits into a first ciphertext block. The first ciphertext block is used to generate a keystream, which is then used to encrypt a second ciphertext block.

27 Claims, 10 Drawing Sheets

| 148 ENCODED SPEECH BITS | | |
|---|---|---|
| 80 FIRST LEVEL BITS | | 68 SECOND LEVEL BITS |
| OUTPUT 32-1 | OUTPUT 32-2 | OUTPUT 32-3 |
| FIRST BLOCK | SECOND BLOCK | THIRD BLOCK |
| 48 CLASS 1A BITS | 48 CLASS 1B BITS<br>32 FIRST LEVEL BITS<br>16 SECOND LEVEL BITS | 52 CLASS 2 BITS |

ENCRYPTING SPEECH CODER

FIELD OF THE INVENTION

The present invention relates generally to communication systems and, in particular, to encryption techniques utilized in wireless communication systems.

BACKGROUND OF THE RELATED ART

Wireless communication systems use cryptography to provide secured communication means for their subscribers. Cryptography provides security such that only an intended receiver can understand the content of a message (which may be, for example, voice data, user data, or FACCH/SACCH messages) transmitted by an authorized transmitter, and only the authorized transmitter can send the message to the intended receiver. The challenge of cryptography is to change the content of the message into a form that only the intended receiver can comprehend. This must be done in a way that is both economical for the transmitter and for the intended receiver. At the same time, it must be very difficult (in terms of time and/or equipment) for an unauthorized receiver (i.e., not the intended receiver) to comprehend the content. As unauthorized receivers and transmitters become more sophisticated, the need for secure communications becomes greater.

FIG. 1 depicts an encryption speech processor architecture incorporated within a transmitter 10 based on the well-known Telecommunication Industrial Association's (TIA) IS-136 (and revisions) standard for time division multiple access (TDMA) and IS-641 standard for Algebraic Code Excited Linear Prediction (ACELP). Transmitter 10 comprises Speech Coder 12, Seven Bit Cyclical Redundancy Coder (7-Bit CRC) 14, Half-Rate Convolutional Coder (½-Rate CC) 16, Puncture 18, Voice Cipher 20 and Two-Slot Interleaver 22. Speech Coder 12 encodes a message frame comprising 160 16-bit speech samples to produce 148 encoded speech bits having 96 Class 1 bits and 52 Class 2 bits, wherein the Class 1 bits includes 48 Class 1A bits and 48 Class 1B bits. The Class 1 bits are important bits (e.g., bits representing pitch, intonation, etc.) which require error control protection when transmitted over radio links, wherein error control protection is provided using the cyclical redundancy code, convolutional coding and bit interleaving. The Class 1A bits are provided as input to 7-Bit CRC 14 to produce 7 error control bits. The error control bits, the Class 1 bits and 5 tail bits (comprising convolution code state information) are provided as inputs to ½-Rate CC 16 to produce 216 code word bits. The code word bits then undergoes erasure insertion (via Puncture 18) to produce 208 punctured code word bits.

Voice Cipher 20 is used next to secure the message such that only the intended receiver can comprehend the content of the message. Specifically, the punctured code word bits and the Class 2 bits are provided as inputs to Voice Cipher 20. Voice Cipher 20 encrypts the inputs using a 260 bit fixed secret mask associated with the intended receiver to produce 260 encrypted bits. Specifically, encryption is achieved by performing an XOR binary operation on the punctured code word bits and class 2 bits using the secret mask. The encrypted bits are bit interleaved (by Bit Interleaver 22) to produce 260 interleaved bits. The message is then multiplexed, modulated and transmitted by the transmitter 10.

The transitted message is received by a receiver, not shown, where the inverse function of the transmitter 10 is performed. Upon receiving the transmitted message, the receiver demodulates and demultiplexes the transmitted message to obtain 260 interleaved bits. The bit interleaving process is then reversed (by a bit de-interleaver) to obtain 260 encrypted bits. The encrypted bits are decrypted (by a voice decipher) to obtain an output having 208 punctured code word bits and 52 Class 2 bits. If the receiver does not know the 260 bit fixed secret mask employed by the transmitter 10 (i.e., the receiver is not the intended receiver), the receiver would not be able to properly decrypt the encrypted bits.

The punctured code word bits are provided to a ½-rate convolution de-coder where the punctured code word bits are de-convoluted to obtain an output having 96 Class 1 bits (comprising 48 Class 1A bits and 48 Class 1B bits) and 7 error control bits. Note that there is no inverse function of the erasure insertion process at the receiver. The bits loss due to erasure insertion are restored in the de-convolution process, as is well-known in the art.

The Class 1A bits are used by a 7-bit CRC at the receiver to produce a second set of 7 error control bits (wherein the first set of 7 error control bits are part of the ½-rate convolutional decoder's output). The first and second sets of error control bits are compared (using a CRC check) to determine whether an error occurred with respect to the transmission of the Class 1A bits (i.e., determine whether a bad frame exist). If no transmission error occurred, the Class 1 bits and the Class 2 bits (from the voice decipher) are passed to a speech decoder to be decoded. If a transmission error occurred (i.e., a bad frame is detected), the Class 1A bits and the 32 most significant Class 1B bits may be discarded and replaced with some function or interpolation of the Class 1A bits and the 32 most significant Class 1B bits of the last good frame(s), and passed to the speech decoder. The Class 2 bits (from the voice decipher) and the 16 least significant Class 1B bits (from the ½-rate convolutional decoder) are passed to the speech decoder where they are decoded along with the passed function or interpolation of the Class 1A bits and the 32 most significant Class 1B bits of the last good frame(s). Note that if there are any bit errors in the Class 2 bits and the 16 least significant Class 1B bits, such errors will have less perceptual impact on speech quality than errors in the remaining Class 1B and Class 1A bits.

The prior art encryption architecture incorporating a voice cipher offers certain advantages. First, cryptosync from an external source (hereinafter referred to as "external cryptosync") is not required for synchronizing the 260 bit fixed secret mask at both ends (i.e., at the transmitter and receiver), wherein cryptosync is data input for ensuring two cryptographic algorithms are synchronized with each other. Second, there is no degradation in speech quality in the presence of transmission errors. Errors in the transmission of the Class 1A bits and the 32 most significant Class 1B bits can be masked using some function or interpolation of the Class 1A bits and the 32 most significant Class 1B bits of the last good frame(s). The prior art encryption architecture, however, is susceptible to security problems in two manners. First, the 260 bit fixed secret mask can be determined using known plaintext (i.e., input to the Voice Cipher), which can then be used to comprehend (or decrypt) the encrypted bits, therefore compromising the security of the transmitted message. Second, even in the absence of known plaintext, merely XOR'ing adjacent 260-bit frames will eliminate the fixed secret mask and may yield information about how the ACELP speech algorithm's parameters are changing. Accordingly, there exists a need for a speech processor architecture that provides enhanced security without the use of external cryptosync and with minimal speech degradation.

SUMMARY OF THE INVENTION

The present invention is an encrypting speech processor architecture that provides enhanced security without the use of external cryptosync and with minimal speech degradation. This is accomplished by incorporating a block encryptor and a keystream generator (instead of a fixed secret mask encryption scheme, such as those implemented in voice ciphers) for encrypting blocks of encoded speech bits at a transmitter side. The block encryptor employs an invertible cryptographic algorithm and internal cryptosync to convert a first block of encoded speech bits into a first ciphertext block, wherein the first block of encoded speech bits includes first level bits which would cause significant perceptual degradation in speech quality if an error occurred during its transmission (and the erred bits were used instead of some function or interpolation of bits from prior good frames). Note that the term internal cryptosync is used herein to refer to cryptosync originating from within the block encryptor, and not a source external to the block encryptor.

The first ciphertext block is then provided as input to the keystream generator and a cyclical redundancy check. The keystream generator employs an invertible cryptographic algorithm (used as a keyed one-way function) and internal cryptosync comprising the first ciphertext block to output the first ciphertext block into a keystream comprising encrypted first ciphertext blocks. The keystream is subsequently used to encrypt a second and third block of encoded speech bits to produce a second ciphertext block and a third ciphertext block, respectively, wherein the third block of encoded speech bits includes second level bits that will cause little or no perceptual degradation in speech quality if an error occurs during the transmission of the first ciphertext block, and the second block of encoded speech bits includes first and second level bits.

In the cyclical redundancy check, the first ciphertext block is used to produce error control bits, which can be used to detect whether an error occurred in the transmission of the first ciphertext block—that is, the first ciphertext block is protected by some type of transmission error detection mechanism. The first, second and third ciphertext blocks and the error control bits are subsequently processed and transmitted.

At the receiver side, the error control bits and the received first ciphertext block are used to determine whether an error occurred in the transmission of the first ciphertext block. If no error is detected, the received first ciphertext block is decrypted by a block decryptor and is used to decrypt the received second and third ciphertext blocks (via a keystream generator identical to the keystream generator at the transmitter side). If an error is detected, the first level bits (in the first and second ciphertext blocks) are masked using some function or interpolation of the first level bits in one or more last good frames. The second level bits (in the second and third ciphertext blocks) may be passed directly to a speech decoder instead of being (erroneously) decrypted, in order to save processing cycles.

Advantageously, this embodiment of the present invention does not extend errors in and from the first level bits. Specifically, if an error occurred to any bit in the received first ciphertext block, such error will not extend to any other first level bits because all first level bits will be masked by some function or interpolation of the first level bits in one or more last good frames. Although an error occurring to any bit in the received first ciphertext block will extend to second level bits, such error will have little or no perceptual impact to speech quality. Note that if there are no errors to any bit in the received first ciphertext block, no errors will be extended to any other first level or second level bit.

Furthermore, the block encryptor and the keystream generator advantageously employ cryptographic algorithms (or keyed one-way functions) that are much more cryptographically secure that the 260 bit fixed secret mask employed by voice ciphers used in the prior art. Thus, the encrypting speech processor architecture of the present invention is much more cryptographically secure the prior art. Additionally, internal cryptosync is utilized to synchronize encrypting and decrypting cryptographic algorithm components. Thus, no external cryptosync is required.

BRIEF DESCRIPTION OF THE DRAWINGS

The features, aspects, and advantages of the present invention will become better understood with regard to the following description, appended claims, and accompanying drawings where:

FIG. 3 depicts a representative diagram describing the encoded speech bits as characterized in this application;

DETAILED DESCRIPTION

Figure 1:
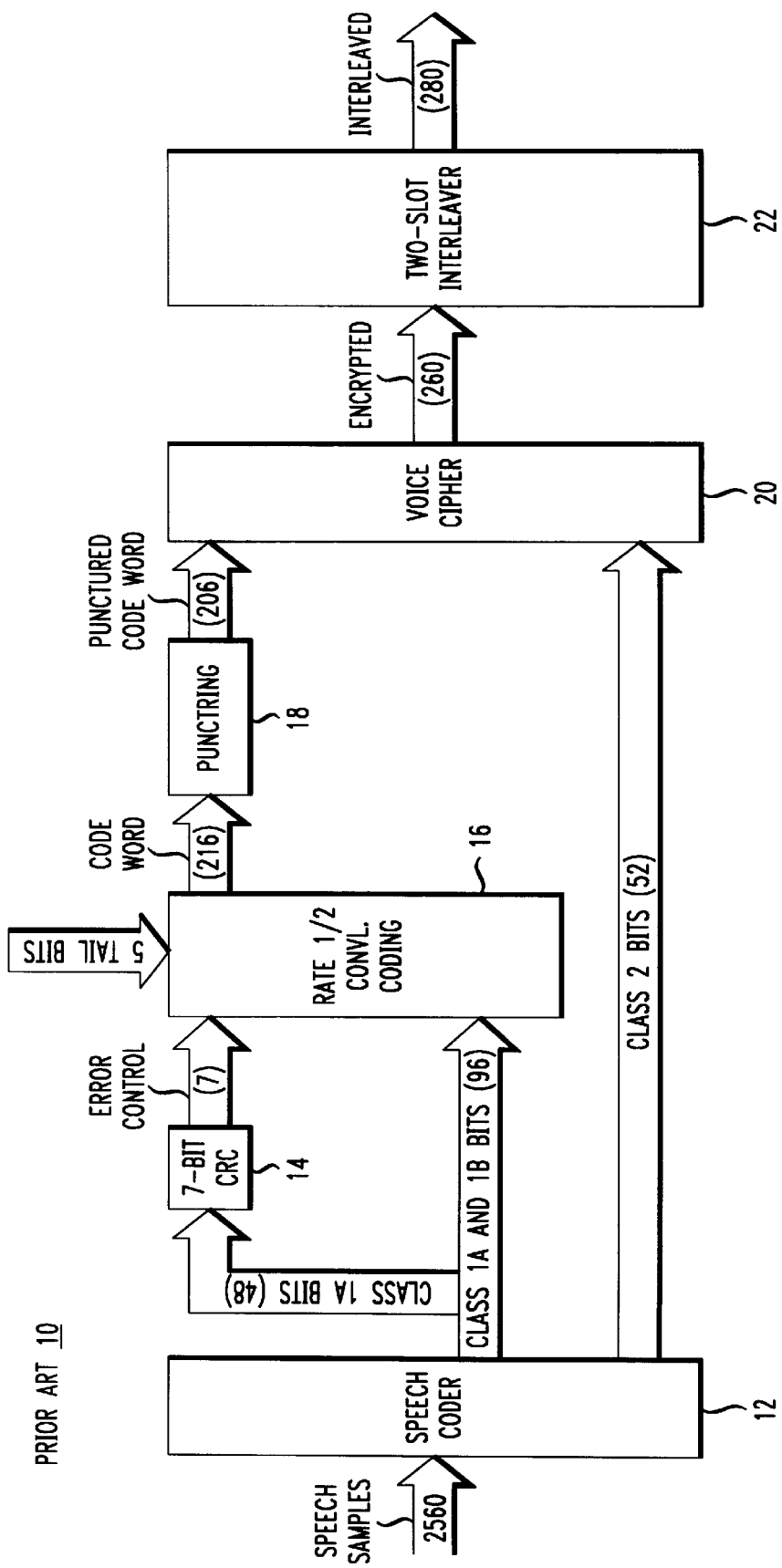
FIG. 1 depicts a prior art speech processor, error protection, and voice ciphering architecture.
Figure 2:
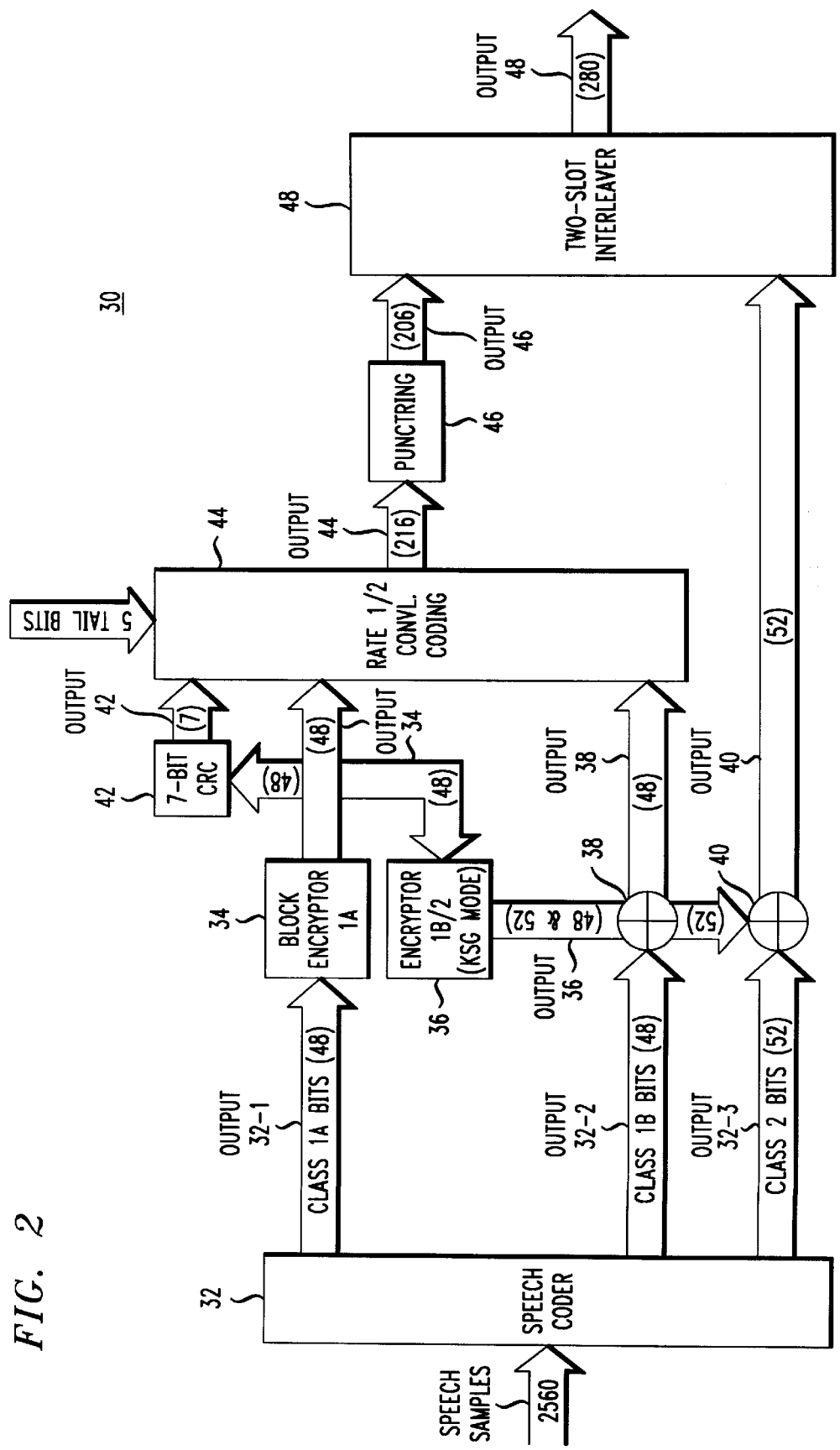
FIG. 2 depicts a speech processor architecture incorporated within a transmitter used in accordance with the present invention.

FIG. 2 depicts a speech processor architecture incorporated within a transmitter 30 used in accordance with the present invention. For illustrative purposes, the present invention will be described herein with reference to a speech processor architecture based on the well-known IS-136 (and revisions) standard for time division multiple access (TDMA) and IS-641 standard for Algebraic Code Excited Linear Prediction (ACELP). This should not, however, be construed to limit the present invention in any manner.

The transmitter 30 comprises a speech processor architecture having Speech Coder 32, Block Encryptor 34, Keystream Generator 36, XOR Operators 38, 40, Seven Bit Cyclical Redundancy Coder (7-Bit CRC) 42, Half Rate Convolutional Coder (½-Rate CC) 44, Puncture 46 and Two-Slot Interleaver 48. The speech processor architecture may be implemented as software executing on a computer processor, application specific integrated chip, etc. Speech Coder 32, XOR Operators 38, 40, 7-bit CRC 42, ½-Rate CC 44, Puncture 46 and Two-Slot Interleaver 48 are all well-known in the art. Block Encryptor 34 and Keystream Generator 36 will be described herein.

Speech Coder 32 receives a message frame comprising 160 16-bit speech samples to be transmitted. The term "speech samples", for purposes of this application, shall be construed to include, but is not limited to, speech data, user data or control channel messages. The frame is encoded by Speech Coder 32 to produce $output_{32}$ comprising 148 encoded speech bits having first and second level encoded speech bits. See FIG. 3, which depicts a table 45 describing the encoded speech bits as characterized in this application.

The encoded speech bits are subsequently apportioned and processed in three blocks. The first block (also referred to herein as Class 1A bits or $output_{32-1}$) includes 48 first level bits, wherein the first level (encoded speech) bits represent speech characteristics that will perceptibly degrade speech quality if a transmission error occurs in any bits of the first block. The second block (also referred to herein as Class 1B bits or $output_{32-2}$) includes 32 first level bits and 16 second level bits, wherein the second level (encoded speech) bits represent speech characteristics that will not perceptibly degrade speech quality if a transmission error occurs in any bits of the first block. The third block (also referred to herein as Class 2 bits or $output_{32-3}$) includes 52 second level bits. Specifically, with respect to the second block, the first level bits are the 32 most significant bits of the second block and the second level bits are the 16 least significant bits of the second block. Note that the present invention should not be limited to the number of blocks into which the encoded speech bits are apportioned nor the number of bits in each block. Since the first level bits will perceptibly degrade speech quality if a transmission error occurs, error control protection is applied to as many of these bits as possible, wherein error control protection is provided, for example, via cyclical redundancy code and convolutional coding.

From Speech Coder 32, the Class 1A bits (first block) are provided as input to Block Encryptor 34, the Class 1B bits (second block) are provided as input to XOR Operator 38 and the Class 2 bits (third block) are provided as input to XOR Operator 40. Block Encryptor 34 employs an invertible cryptographic algorithm having a key associated with the intended receiver for encrypting blocks of plaintext into ciphertext. Examples of such cryptographic algorithms include RC5 and Enhanced Cellular Messaging Encryption Algorithm (ECMEA). RC5 was developed by Ron Rivest and is well-known in the art. ECMEA was developed by Robert Rance, Daniel Heer, Semyon Mizikovsky, et. al. ECMEA was disclosed on Oct. 28, 1997 at the TIA TR45 Ad-Hoc Authentication Group meeting, attended by members of TIA and is available for a limited and controlled distribution by TIA subject to the export jurisdiction of the United States Department of Commerce as specified in Export Administration Regulations (title 15 CFR parts 730 through 774 inclusive).

Figure 4:
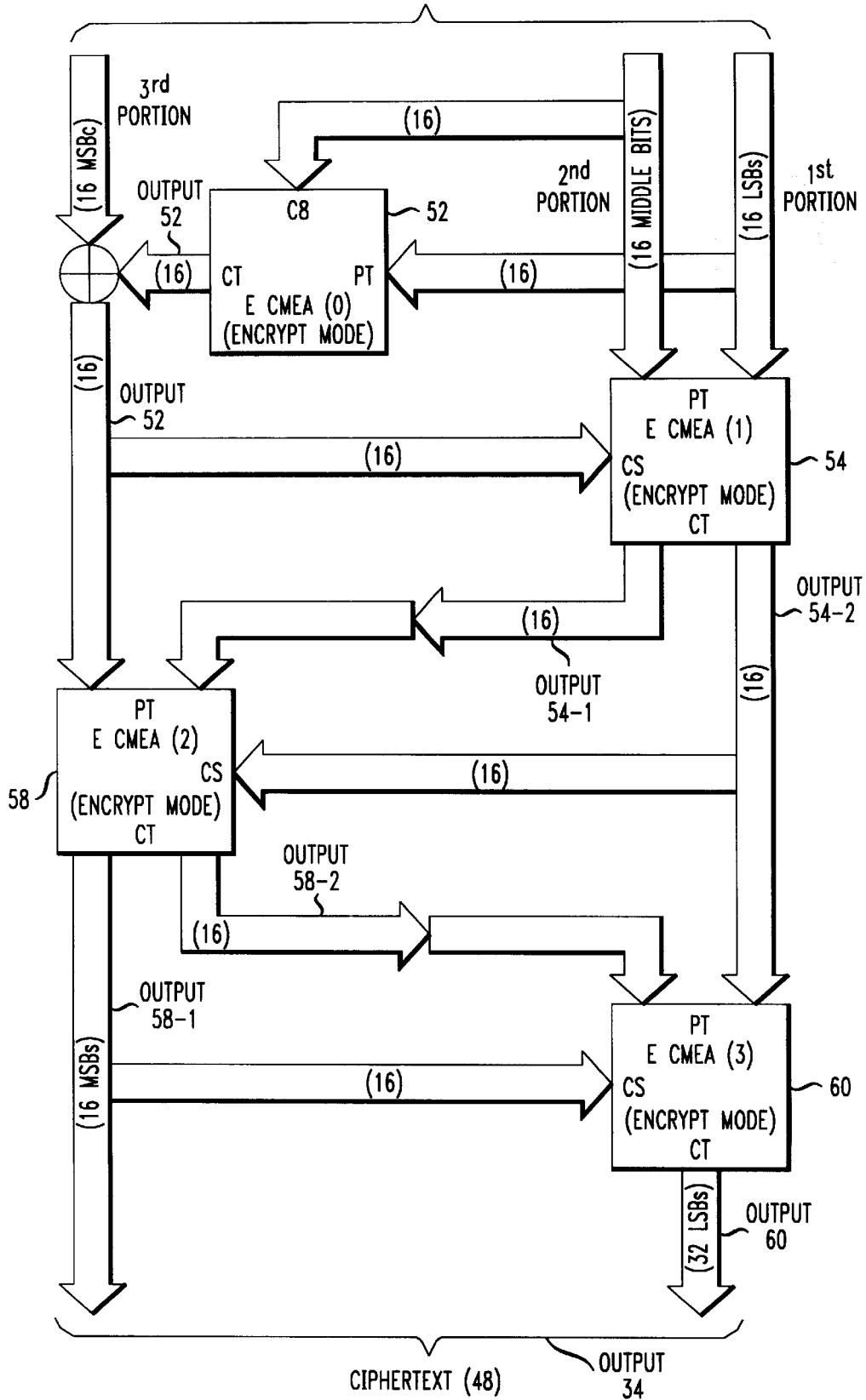
FIG. 4 depicts a functional block diagram of a block encryptor employing Enhanced Cellular Message Encryption Algorithms (ECMEA) for encrypting 48 bit blocks of plaintext into ciphertext in accordance with one embodiment of the present invention.

In Block Encryptor 34, the Class 1A bits are encrypted to produce $output_{34}$ comprising 48 Class 1A ciphertext bits (or a first ciphertext block). FIG. 4 depicts a functional block diagram of Block Encryptor 34 employing ECMEA for encrypting 48 bit blocks of plaintext into ciphertext in accordance with one embodiment of the present invention. Block Encryptor 34 comprises First, Second, Third, and Fourth ECMEMA function calls 52, 54, 58, and 60 and XOR Operator 56. Generally, ECMEA function calls 52, 54, 58 and 60 may operate in either encryption mode (for encrypting their inputs) or counter mode (for generating a keystream). In Block Encryptor 34, ECMEA function calls 52, 54, 58 and 60 are operating in encryption mode for encrypting their inputs.

A first and a second 16 bit portion of the Class 1A bits (hereinafter referred to as first and second Class 1A portions, respectively) are provided as inputs to First and Second ECMEA function calls 52, 54. First ECMEA function call 52 encrypts the first Class 1A portion using the second Class 1A portion as cryptosync input to produce 16 bit $output_{52}$.

As is well-known in the art, cryptosync is used for purposes of synchronizing encrypting and decrypting cryptographic algorithms. However, in ECMEA particularly, cryptosync is also used as keying bits for purposes of enhancing ECMEA's cryptographic strength. In this role, ECMEA is being used as a keyed hash function to both concentrate the entropy of the first and second Class 1A portions and to increase the overall cryptographic strength of the 48-bit Block Encryptor. Note that the (*) notation next to the ECMEA label in the function call box indicates that the binary equivalent of the number in parentheses is XORed with the cryptosync input (CS) input before further processing by ECMEA wherein * denotes an integer value from 0 to 3. This is a method known to those skilled in the art to prevent certain attacks against cryptoalgorithms formed from identical elements.

Figure 5:
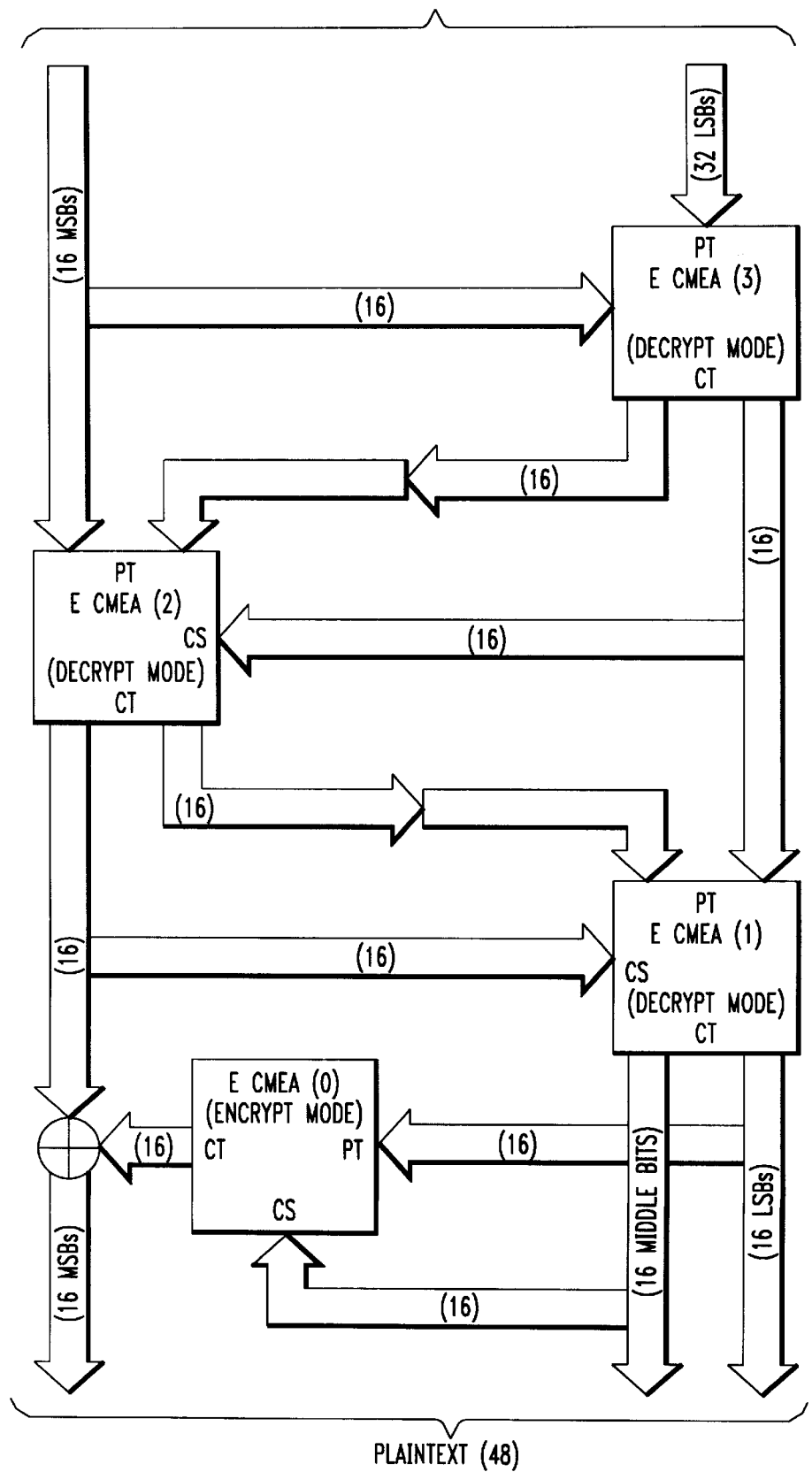
FIG. 5 depicts a functional block diagram of a 48 bit block decryptor for performing the inverse function of the block encryptor depicted in FIG. 4.

$Output_{52}$ is XOR'ed with a third 16 bit portion of the Class 1A bits (hereinafter referred to as a third Class 1A portion) in XOR Operator 56 to produce 16 bit $output_{56}$. $Output_{56}$ is provided as inputs to Second and Third ECMEA function calls 54, 58. Second ECMEA function call 54 uses $Output_{56}$ as cryptosync to encrypt the first and second Class 1A portions and produce 16 bit $output_{54-1}$ and 16 bit $output_{54-2}$, respectively. Third ECMEA function call 58 encrypts $output_{56}$ and $output_{54-1}$ using $output_{54-2}$ as cryptosync to produce 16 bit $output_{58-1}$ and 16 bit $output_{58-2}$, respectively. Fourth ECMEA function call 60 encrypts $output_{58-2}$ and $output_{54-2}$ using $output_{58-1}$ as cryptosync to produce 32 bit $output_{60}$. FIG. 5 depicts a functional block diagram of a 48 bit Decryptor 35 for performing the inverse function of Block Encryptor 34 depicted in FIG. 4.

$Output_{58-1}$ and $output_{60}$ collectively comprise $output_{34}$ of Block Encryptor 34. $Output_{34}$ is provided as inputs to 7-Bit CRC 42, ½-Rate CC 44 and Keystream Generator 36. In 7-Bit CRC 42, $output_{34}$ is used to generate $output_{42}$ comprising 7 error control bits. $Output_{42}$ is subsequently provided as input to ½ rate CC 44.

Keystream Generator 36 employs either an invertible cryptographic algorithm, such as RC5 and ECMEA (operating in counter mode), or a suitable non-invertible keyed one way function having a key associated with the intended receiver for outputting a keystream of bits. Note that an one way function is a general type of cryptographic operation and, in fact, includes invertible cryptographic algorithms as a subclass. A person observing the output of a keyed one-way function cannot infer either the key or the input.

Keystream Generator 36 is driven by the 48 Class 1A ciphertext bits (i.e., $output_{34}$) repeated enough times at Keystreamn Generator 34's input to fill a 104 bit block.

Successive repetitions are byte-wise XORed with binary equivalents of monotonically increasing numbers. For example, the second set of six Keystream Generator input octets are each XORed with the binary equivalent of 1, and the third set with the binary equivalent of 2. In Keystream Generator 36, the Class 1A ciphertext bits are encrypted to produced keystream $output_{36}$ comprising 100 bits of encrypted Class 1A ciphertext bits. Specifically, $output_{36}$ is generated by running the cryptographic algorithm (being employed by Keystream Generator 36) by encrypting publicly known pseudo random data which is, in fact, the Class 1A ciphertext bits. Note that 4 of the Class 1A ciphertext bits (comprising the 104 bit block) are discarded because ECMEA (and most other block algorithms) only encrypt integral numbers of bytes.

Figure 6:
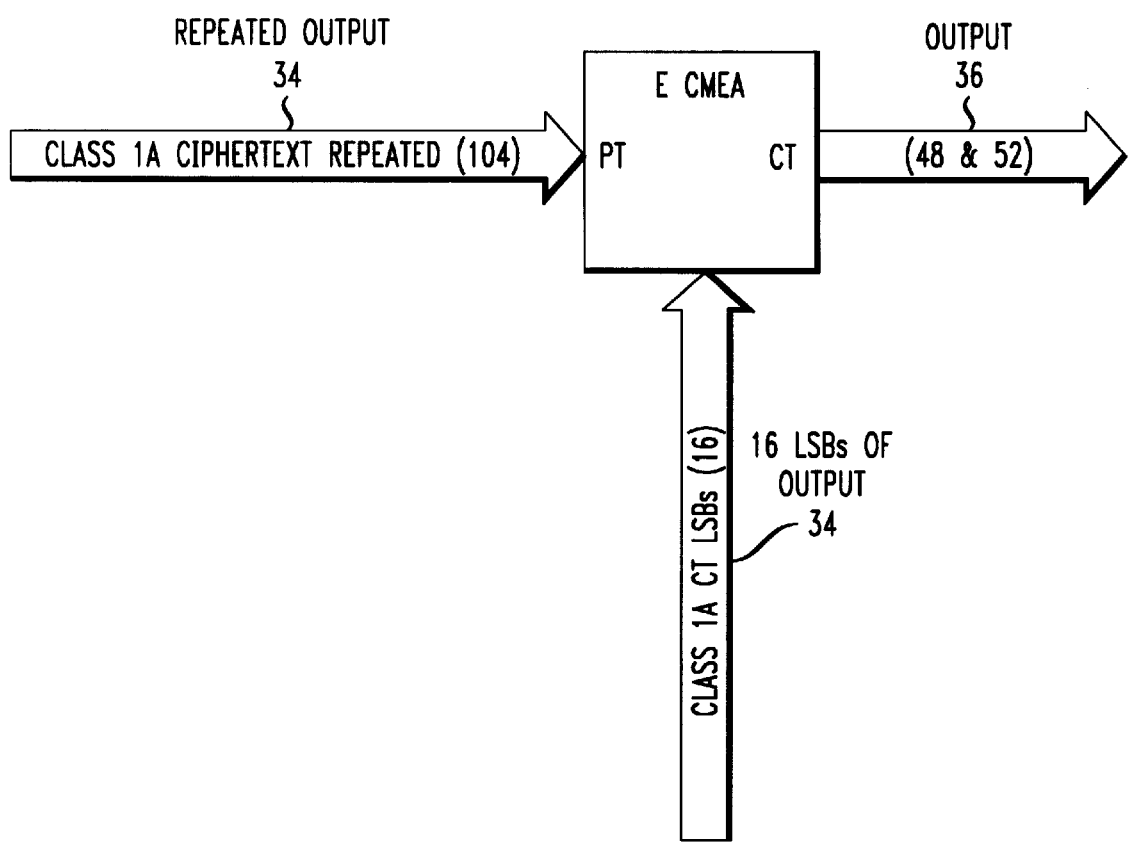
FIG. 6 depicts a functional block diagram of a keystream generator (KSG) employing ECMEA operating in counter mode in accordance with one embodiment of the present invention.

FIG. 6 depicts a functional block diagram of Keystream Generator 36 employing ECMEA in accordance with one embodiment of the present invention. Keystream Generator 36 comprises ECMEA function call 62 operating in counter mode, which receives the 104 bit block input comprising repeated $output_{34}$ (from Block Encryptor 34). Note that Block Encryptor 34's output is appended or concatenated to itself to yield 96 bits, and then partially appended one more time to yield a 104 bit block input to Keystream Generator. The 104 bit block input is encrypted by the ECMEA function call 62 using the 16 most significant bits of $output_{34}$ (i.e., 16 most significant bits of the 48 Class 1A ciphertext bits) as cryptosync to produce $output_{36}$.

$Output_{36}$ is provided as inputs to XOR Operators 38 and 40. Specifically, a 48 bit portion of $output_{36}$ is provided as input to XOR Operator 38 and a 52 bit portion of $output_{36}$ is provided as input to XOR Operator 40. In XOR Operator 38, the Class 1B bits (i.e., second block) are XOR'ed with the 48 bit portion of $output_{36}$ to produce $output_{38}$ comprising 48 Class 1B ciphertext bits (i.e., second ciphertext block). $Output_{38}$ is then provided as input to ½-Rate CC 44. Likewise, in XOR Operator 40, the Class 2 bits (i.e., third block) are XOR'ed with the 52 bit portion of $output_{36}$ to produce $output_{40}$ comprising 52 Class 2 ciphertext bits (i.e., third ciphertext block). $Output_{40}$ is then provided as input to Two-Slot Interleaver 48.

In ½-Rate CC 44, $output_{42}$, $output_{34}$ and $output_{38}$ along with 5 tail bits (comprising convolution code state information) are used to produce $output_{44}$ comprising 216 code word bits. $Output_{44}$ is provided to Puncture 46 to produce $output_{46}$ comprising 208 punctured code word bits. $Output_{46}$ is then provided to Two-Slot Interleaver 48 where it is bit interleaved with $output_{40}$ to produce $output_{48}$ comprising 260 interleaved bits. $Output_{48}$ is subsequently multiplexed, modulated, and transmitted by the transmitter 30.

Figure 7:
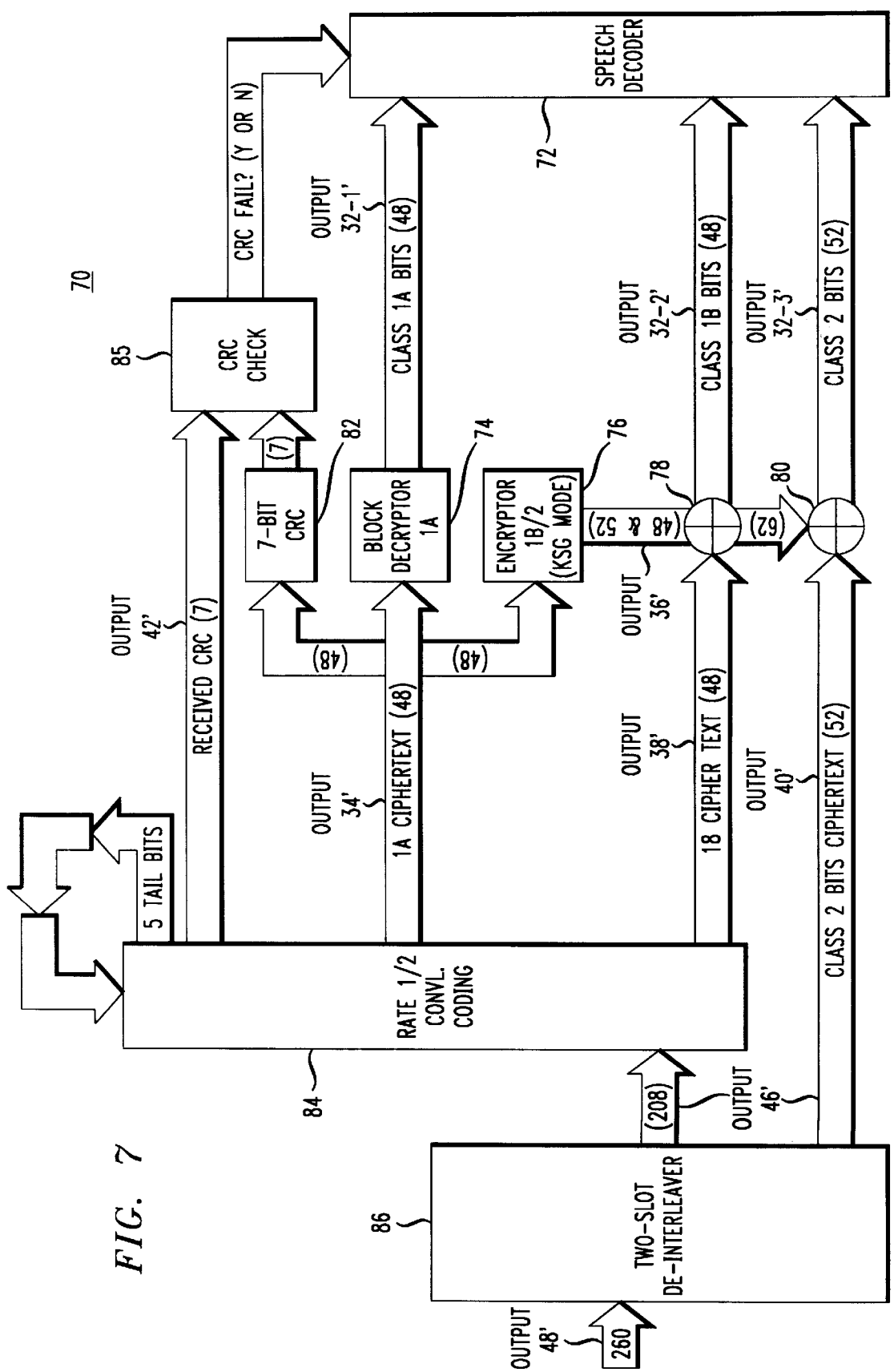
FIG. 7 depicts a speech processor architecture incorporated within a receiver used in accordance with the present invention

The transmitted message is received by a receiver where the inverse function of the transmitter 10 is performed. FIG. 7 depicts a speech processor architecture incorporated within a receiver 70 used in accordance with the present invention. The receiver 70 comprises a speech processor architecture having Speech Decoder 72, Block Decryptor 74, Keystream Generator 76, XOR operators 78, 80, 7-Bit CRC 82, ½-Rate Convolutional Decoder 84, CRC Check 85, and Two-Slot Bit De-Interleaver 86. The speech processor architecture may be implemented as software executing on a computer processor, application specific integrated chip, etc. Speech Decoder 72, XOR operators 78, 80, 7-Bit CRC 82, ½-Rate Convolutional Decoder 84, CRC Check 85, and Two-Slot Bit De-Interleaver 86 are all well-known in the art. Block Decryptor 74 and Keystream Generator 76 will be described herein.

Upon receiving the transmitted message, the receiver demodulates and demultiplexes the transmitted message to obtain $output_{48'}$ (i.e., 260 interleaved bits), wherein the prime notation shall be construed to indicate a received version of the corresponding transmitted version. Two-Slot Bit De-Interleaver 86 uses $output_{48'}$ to produce $output_{46'}$ (i.e., 208 punctured code word bits and 52 Class 2 ciphertext bits or third ciphertext block). The 208 punctured code word bits are then de-convoluted by ½-Rate Convolution Decoder 84 to obtain 5 tail bits, $output_{42'}$ (i.e., 7 error control bits), $output_{34'}$ (i.e., 48 Class 1A ciphertext bits or first ciphertext block) and $output_{38'}$ (i.e., 48 Class 1B ciphertext bits or second ciphertext block). Note that there is no operation at the receiver 80 for reversing the erasure insertion process of Puncture 46. The bits lost due to erasure insertion are restored by ½-Rate Convolutional Decoder 84 in the receiver.

$Output_{34'}$ is provided as input to the 7-Bit CRC 82 to produce a second set of 7 error control bits (wherein the first set of 7 error control bits collectively comprise $output_{42'}$, which are the 7 error control bits outputted by ½-Rate Convolution Decoder). The first and second sets of error control bits are examined by CRC Check 85 to determine whether there was an error (i.e., determine whether a bad frame exist) in the transmission of the first ciphertext block (i.e., Class 1A ciphertext bits). If no transmission error occurred, $output_{34'}$ (i.e., Class 1A ciphertext bits) is passed to Block Decryptor 74 and to Keystream Generator 76. Block Decryptor being operable to perform the inverse function of Block Encryptor 34, as shown in FIG. 5 (which performs the inverse function of Block Encryptor 34 depicted in FIG. 4), and Keystream Generator 76 being identical to Keystream Generator 36.

In Block Decryptor 74, $output_{34'}$ is decrppted to obtain $output_{32-1'}$ (i.e., 48 Class 1A bits). In Keystream Generator 76, $output_{34'}$ is used to produce a keystream $output_{36'}$ (i.e., 100 encrypted Class 1A ciphertext bits). The keystream is then used to XOR $output_{38'}$ (i.e., Class 1B ciphertext bits) and $output_{40'}$ (i.e., Class 2 ciphertext bits) in order to obtain $output_{32-2'}$ (i.e., Class 1B bits) and $output_{32-3'}$ (i.e., Class 2 bits). $Output_{32-1'}$, $output_{32-2'}$ and $output_{32-3'}$ (i.e., Class 1A bits, Class 1B bits and Class 2 bits) are decoded by Speech Decoder 72 to obtain the original message frame.

If a transmission error occurred, the first level bits (i.e., the Class 1A bits and the 32 most significant Class 1B bits) are discarded and replaced with some function or interpolation of the first level bits of one or more previous good frames (as described in the well-known IS-641 standard), and passed to Speech Decoder 72. There would be no need to block decrypt the Class 1A bits or generate a keystream (using the Keystream Generator 76) since these data would be irrelevant given a failed CRC. Thus it is not possible to decrypt the second level bits (i.e., the Class 2 bits and the 16 least significant Class 1B bits. Avoidance of these tasks will save processor cycles. The degradation in speech quality due to these second level bits remaining encrypted will have little or no perceptual impact.

Figure 8:
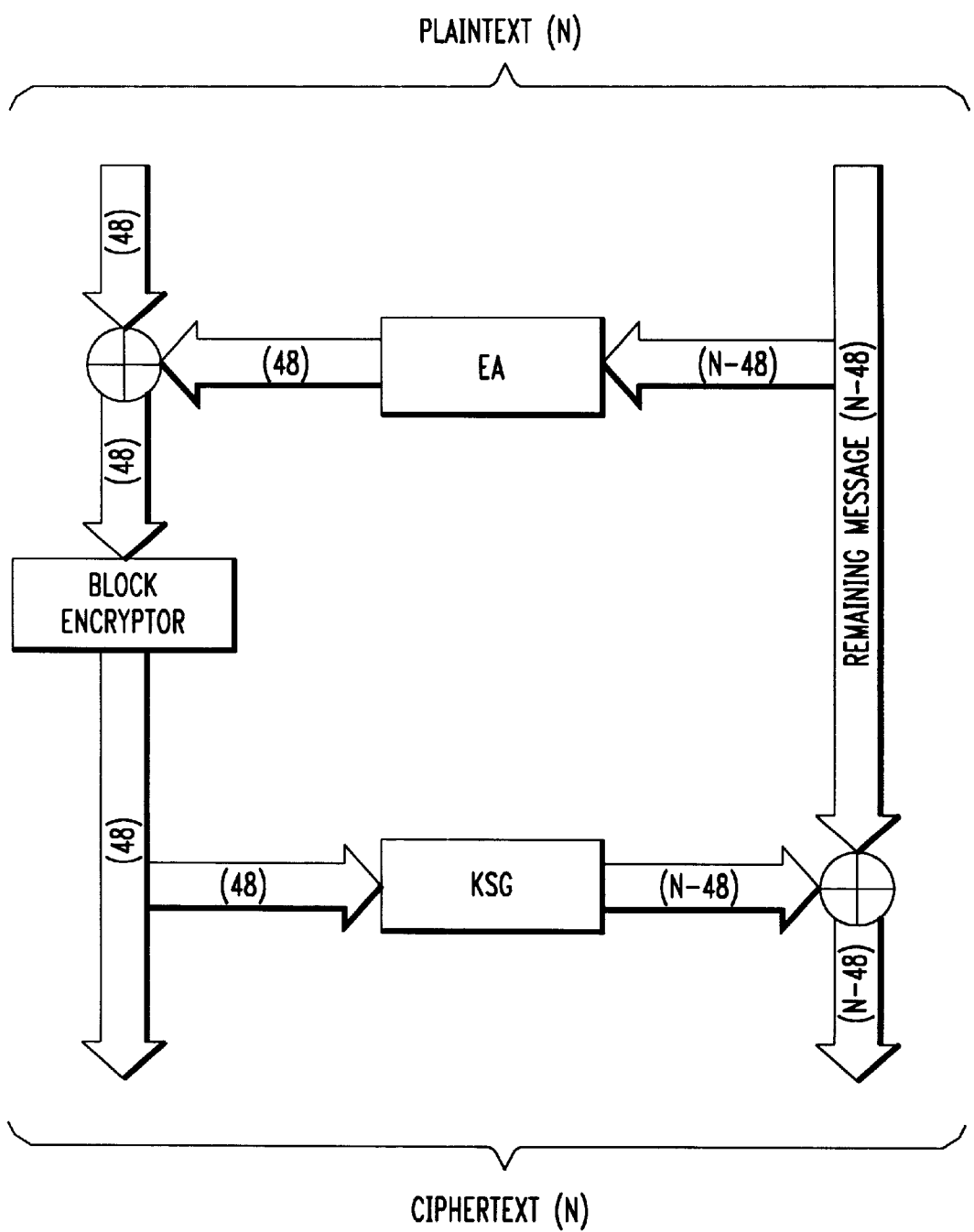
FIG. 8 depicts a function block diagram of a message encryptor employing ECMEA in accordance with one embodiment of the present invention for messages 48 bits or longer in the absence of external cryptosync.

Note that DTC (Digital Traffic Channel) FACCH and SACCH and DCCH (Digital Control Channel) message encryption can be provided by the present invention in a similar manner to voice privacy where cryptosync needs to originate internally rather than externally. FIG. 8 depicts an extension of the voice privacy encryptor for use in encrypting messages 48 bits and greater. The term "EA" denotes Entropy Accumulator which, in the proposed encryptor, takes the form of successive 48-bit-wide XORs to gather and concentrate the entropy from the right hand side (RHS) of the message.

Figure 9:
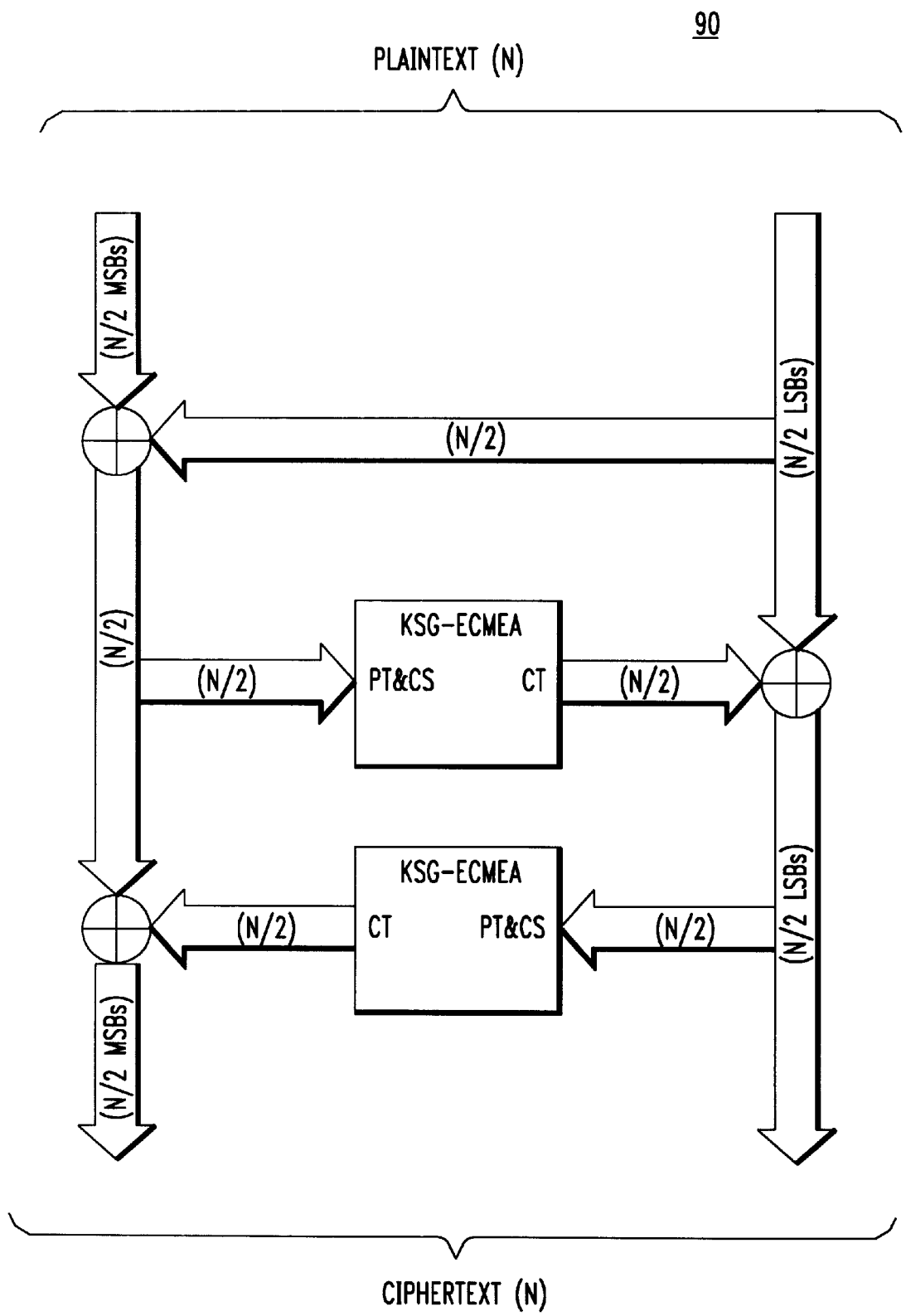
FIG. 9 depicts a function block diagram of a message encryptor for messages less than 48 bits long in the absence of external cryptosync.

FIG. 9 depicts an encryptor for those messages without external cryptosync which are shorter than 48 bits. This encryptor uses the KSG (Keystream Generator) form of ECMEA. To further enhance the variability of short messages like these, we use the following: The first word of each message includes an 8 bit Message Type, which would need to remain unencrypted. The plaintext (PT) input of ECMEA is thus extended by one byte to accommodate the Message Type field.

For those messages with cryptosync and another data type called "User Data" that carries its own cryytosync, the KSG form of ECMEA is used directly by inputting the external cryptosync to the PT and CS inputs.

In one embodiment of the invention, ECMEA has been further strengthened by replacing the ECMEA offset equations as described in the well-known Common Cryptographic Algorithm standard and the following earlier file patent applications, which are incorporated herein by reference: U.S. Ser. No. 09/124,300, offset12=(($K_1$+1)*(CS+1)mod 65537) XOR $K_2$ offset1=(offset12>>8)mod 256 offset2=offset12 mod 256 with:

offset12=(($K_1$+1)*(CS+1)mod 65537) XOR $K_2$ (no change)

offset1=(offset12>>8)mod 256(no change)

offset2=offset1 XOR MAX(offset12 mod 256, 1).

Figure 10:
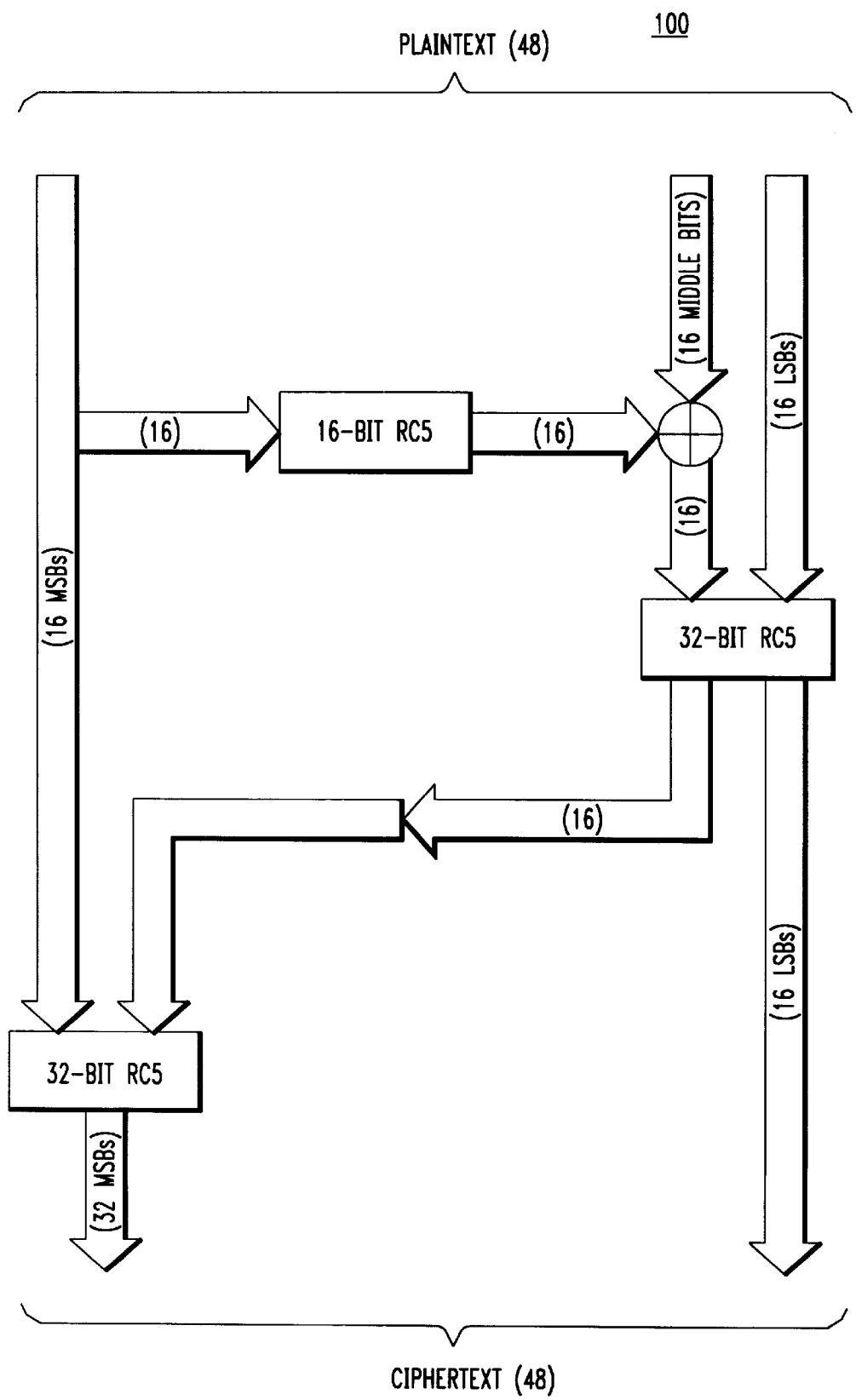
FIG. 10 depicts a function block diagram of a 48 bit block encryptor employing RC5 in accordance with one embodiment of the present invention.

Although the present invention has been described in considerable detail with reference to certain embodiments, other versions are possible. For example, other encryptors and decryptors are possible. See FIG. 10, which depicts a 48 bit block encryptor 100 employing RC5. It would be apparent to one of ordinary skill in the art to apply the concept of the present invention to speech processor architectures utilizing other types of speech coders, error control mechanisms, and encryption and/or cryptographic algorithms. Therefore, the spirit and scope of the present invention should not be limited to the description of the embodiments contained herein.

We claim:

1. A method of encrypting a message frame, the message frame including a first block having first level encoded speech bits, a second block having second level encoded speech bits and a third block having first level encoded speech bits and second level encoded speech bits, the method comprising the steps of:

encrypting the first block to produce a first ciphertext block;

generating a keystream of bits using the first ciphertext block;

encrypting the second block using the keystream of bits to produce a second ciphertext block; and encrypting the third block using the keystream of bits to produce a third ciphertext block.

2. The method of claim 1, wherein the third block comprises 32 first level encoded speech bits and 16 second level encoded speech bits.

3. A method of encrypting a message frame, the message frame including a first block having first level encoded speech bits and a second block having second level encoded speech bits, the method comprising the steps of:

encrypting the first block to produce a first ciphertext block;

generating a keystream of bits using the first ciphertext block, wherein the step of generating the keystream of bits comprises the steps of:

repeating the first ciphertext block to produce a repeated first ciphertext block; and encrypting the repeated first ciphertext block using a portion of the first ciphertext block to produce the keystream of bits;

encrypting the second block using the keystream of bits to produce a second ciphertext block.

4. A method of encrypting a message frame, the message frame including a first block having first level encoded speech bits and a second block having second level encoded speech bits, the method comprising the steps of:

encrypting the first block to produce a first ciphertext block;

generating a keystream of bits using the first ciphertext block;

encrypting the second block using the keystream of bits to produce a second ciphertext block; and generating error control bits using the first ciphertext block.

5. A method of encrypting a message frame, the message frame including a first block having first level encoded speech bits and a second block having second level encoded speech bits, the method comprising the steps of:

encrypting the first block to produce a first ciphertext block, wherein the step of encrypting the first block comprises the steps of:

encrypting a first portion of the first block using a second portion of the first block as cryptosync to produce a first output;

combining the first output with a third portion of the first block using a binary operation to produce a second output;

encrypting the first and second portions of the first block using the second output as cryptosyne to produce a third output having a first part and a second part;

encrypting the second output and the first part of the third output using the second part of third output as cryptosync to produce a fourth output having a first and a second part; and encrypting the second part of the fourth output and the second part of the third output using the first part of the fourth output as cryptosync to produce a fifth output;

generating a keystream of bits using the first ciphertext block; and encrypting the second block using the keystream of bits to produce a second ciphertext block.

6. The method of claim 5, wherein the first ciphertext block comprises the fifth output and the first part of the fourth output.

7. The method of claim 5, wherein the step of encrypting the first portion of the first block using the second portion of the first block as cryptosync is performed using an EMCEA function call.

8. The method of claim 5, wherein the step of combining the first output with the third portion of the first block is performed using an XOR operator.

9. The method of claim 5, wherein the step of encrypting the first and second portions of the first block using the second output as cryptosync is performed using an ECMEA function call.

10. The method of claim 5, wherein the step of encrypting the second output and the first part of the third output using the second part of the third output as crytosync is performed using an ECMEA function call.

11. The method of claim 5, wherein the step of encrypting the second part of the fourth output and the second part of the third output using the first part of the fourth output as cryptosync is performed using an ECEMA function call.

12. A method of encrypting a message frame, the message frame including a first block having first level encoded speech bits and a second block having second level encoded speech bits, the method comprising the steps of:

encrypting the first block to produce a first ciphertext block;

generating a keystream of bits using the first ciphertext block, wherein the keystream of bits include a portion of the first ciphertext block and at least one repeated bit of the portion of the first ciphertext block; and encrypting the second block using a first portion of the keystream of bits to produce a second ciphertext block.

13. The method of claim 12, wherein the second block further includes first level encoded speech bits.

14. The method of claim 13, wherein the second block comprises 32 first level encoded speech bits and 16 second level encoded speech bits.

15. The method of claim 12, wherein the first block comprises 48 first level encoded speech bits.

16. The method of claim 12, wherein the second block comprises 52 second level encoded speech bits.

17. The method of claim 12, wherein the message frame further includes a third block having first level encoded speech bits and second level encoded speech bits, the method comprising the additional step of:

encrypting the third block using a second portion of the keystream of bits to produce a third ciphertext block.

18. The method of claim 17, wherein the third block comprises 32 first level bits and 16 second level bits.

19. The method of claim 12, wherein the step of generating the keystream of bits comprises the steps of:

repeating the first ciphertext block to produce a repeated first ciphertext block; and encrypting the repeated first ciphertext block using a portion of the first ciphertext block to produce the keystream of bits.

20. The method of claim 12 comprising the additional step of:

generating error control bits using the first ciphertext block.

21. The method of claim 12, wherein the step of encrypting the first block comprises the steps of:

encrypting a first portion of the first block using a second portion of the first block as cryptosync to produce a first output;

combining the first output with a third portion of the first block using a binary operation to produce a second output;

encrypting the first and second portions of the first block using the second output as cryptosync to produce a third output having a first part and a second part;

encrypting the second output and the first part of the third output using the second part of third output as cryptosync to produce a fourth output having a first and a second part; and encrypting the second part of the fourth output and the second part of the third output using the first part of the fourth output as cryptosync to produce a fifth output.

22. The method of claim 21, wherein the first ciphertext block comprises the fifth output and the first part of the fourth output.

23. The method of claim 21, wherein the step of encrypting the first portion of the first block using the second portion of the first block as cryptosync is performed using an EMCEA function call.

24. The method of claim 21, wherein the step of combining the first output with the third portion of the first block is performed using an XOR operator.

25. The method of claim 21, wherein the step of encrypting the first and second portions of the first block using the second output as cryptosync is performed using an ECMEA function call.

26. The method of claim 21, wherein the step of encrypting the second output and the first part of the third output using the second part of the third output as crytosync is performed using an ECMEA function call.

27. The method of claim 21, wherein the step of encrypting the second part of the fourth output and the second part of the third output using the first part of the fourth output as cryptosync is performed using an ECEMA function call.

* * * * *